(12) United States Patent
Van Nieuwenhuizen

(10) Patent No.: US 7,643,417 B2
(45) Date of Patent: Jan. 5, 2010

(54) DATA RATE CONTROL

(75) Inventor: Peterjan Van Nieuwenhuizen, Cambridge (GB)

(73) Assignee: British Telecommunications plc, London (GB)

( * ) Notice: Subject to any disclaimer, the term of this patent is extended or adjusted under 35 U.S.C. 154(b) by 414 days.

(21) Appl. No.: 10/521,480

(22) PCT Filed: Jul. 9, 2003

(86) PCT No.: PCT/GB03/02980

§ 371 (c)(1),
(2), (4) Date: Jan. 18, 2005

(87) PCT Pub. No.: WO2004/010643

PCT Pub. Date: Jan. 29, 2004

(65) Prior Publication Data

US 2006/0026004 A1    Feb. 2, 2006

(30) Foreign Application Priority Data

Jul. 18, 2002  (GB)  .................................. 0216728.6

(51) Int. Cl.
*G01R 31/08*  (2006.01)
*H04J 3/16*  (2006.01)

(52) U.S. Cl. ........................ 370/232; 370/235; 370/468
(58) Field of Classification Search ......... 370/232–235, 370/229–230, 230.1, 395.2, 395.21, 236, 370/203.1, 468; 709/232–233
See application file for complete search history.

(56) References Cited

U.S. PATENT DOCUMENTS

| | | | | |
|---|---|---|---|---|
| 5,898,668 A | * | 4/1999 | Shaffer | 370/230 |
| 5,974,033 A | * | 10/1999 | Kamiya et al. | 370/230.1 |
| 6,556,548 B1 | * | 4/2003 | Kirkby et al. | 370/322 |
| 6,671,285 B1 | * | 12/2003 | Kirkby et al. | 370/468 |
| 6,672,285 B2 | * | 1/2004 | Smith et al. | 123/446 |
| 6,728,266 B1 | * | 4/2004 | Sabry et al. | 370/468 |
| 6,813,246 B1 | * | 11/2004 | Phan et al. | 370/238 |

(Continued)

OTHER PUBLICATIONS

Bansal et al., "TCP-Friendly Congestion Control for Real-time Streaming Applications", MIT Technical Report, MIT-LCS-TR-806, May 2000.

(Continued)

*Primary Examiner*—Kwang B Yao
*Assistant Examiner*—Candal Elpenord
(74) *Attorney, Agent, or Firm*—Nixon & Vanderhye PC

(57) ABSTRACT

The rate of data transmission to a user via a communications link of a network is controlled wherein resource requests are communicated to a service provider. The resource requests are determined in accordance with an indication of the congestion level on the network and the user's defined parameters, such as their willingness to pay for the resource, wherein the resource request is weighted by a variable parameter, whose value is set in accordance with the congestion level on the network. This allows the rate controller to react efficiently and swiftly to network conditions as well as user defined parameters. By providing a computer programmed to act as a purchasing agent an automatic resource request to a service provider is enabled. An embodiment is described in which audio or video data is streamed to a user on the basis of the resource requests made on the user's behalf and is adjusted on the basis of user and network defined parameters. Such techniques could also be used to provide appropriate data streaming for many different types of network traffic.

15 Claims, 6 Drawing Sheets

U.S. PATENT DOCUMENTS

| | | | | |
|---|---|---|---|---|
| 7,023,800 | B1* | 4/2006 | McAuley et al. | 370/235 |
| 7,206,285 | B2* | 4/2007 | Loguinov | 370/235 |
| 7,209,443 | B2* | 4/2007 | Mukai et al. | 370/235 |
| 7,284,047 | B2* | 10/2007 | Barham et al. | 709/224 |
| 7,426,471 | B1* | 9/2008 | Briscoe et al. | 705/1 |
| 2001/0032269 | A1* | 10/2001 | Wilson | 709/235 |
| 2002/0002470 | A1* | 1/2002 | Arai | 705/1 |
| 2003/0145098 | A1* | 7/2003 | Litwin | 709/232 |

OTHER PUBLICATIONS

Bibliography of references take from a report written by the Inventor, circa 2000.

Van Nieuwenhuizen, Peterjan, "Rate-based congestion avoidance: engineering a parameterised compromise," (Jan. 31, 2001).

International Search Report mailed Nov. 10, 2003 in PCT/GB03/02980.

European Search Report completed Mar. 27, 2003 in File RS 108702.

Vasilios A. Siris et al., "Service Differentiation in ECN Networks Using Weighted Window-Based Congestion Control for Various Packet Marking Algorithms," 2nd International Workshop on Quality of Future Internet Services (QOFIS), Sep. 2001, pp. 1-18.

Tomaz Turk et al., "Users' Responsiveness in the Price-Controlled Best-Effort QoS Model," Computer Communications, vol. 24, No. 15-16, Oct. 1, 2001, pp. 1637-1647.

FP Kelly et al., "Rate Control for Communication Networks: Shadow Prices, Proportional Fairness and Stability," Journal of the Operational Research Society, Mar. 1998, vol. 49, No. 3, pp. 237-252.

R.J. Gibbens et al., "Resource Pricing and the Evolution of Congestion Control," Automatica, Dec. 1999, pp. 1969-1985.

Bob Briscoe, "Controlling Internet Quality with Price," NSF ITR QOS Workshop, Online, Apr. 15-16, 2002, Annapolis, Maryland, 5 pages.

The M3I Consortium: "Deliverable 3—Pricing Mechanisms Pt II—Price Reaction Design," European Fifth Framework Project, Online, Jul. 10, 2000, pp. 1-24.

W. Stevens, "TCP Slow Start, Congestion Avoidance, Fast Retransmit, and Fast Recovery Algorithms," Request for Comments: 2001, Jan. 1997, pp. 1-6.

* cited by examiner

DATA RATE CONTROL

This application is the US national phase of international application PCT/GB2003/002980 filed 9 Jul. 2003 which designated the U.S. and claims benefit of GB 0216728.6, dated 18 Jul. 2002, the entire content of which is hereby incorporated by reference.

BACKGROUND

1. Technical Field

The present invention relates to a method for controlling the rate of data transmitted to a user on a communications link, and in particular to a method of resource control wherein resource requests from a user to a service provider are determined in response to the amount of congestion on the communications link.

2. Related Art

The last two decades have seen the introduction of so-called 'integrated' networks, such as asynchronous transfer mode (ATM) and Internet Protocol (IP) networks, which are designed to carry both computer communications and telephony. The capacity of those networks needs to be allocated between users who require a constant bit-rate for the duration of a communication (e.g. telephone users), those who can tolerate some variation in the bit-rate supplied to them by the network (e.g. those transferring web-pages, software or e-mails), and those users who can tolerate less variation in the bit-rate supplied to them by the network (e.g. those transferring video clips or other real time applications).

To deal with different user's requirements, integrated networks offer their users the ability to specify which service they wish to receive from the network (which, being an integrated network, can offer a plurality of different services). This specification can be made once at the start of a communication (the normal procedure in networks offering a connection-oriented service, such as ATM networks) and/or repeatedly during a communication.

As mentioned, an Internet Protocol network is one type of integrated network. An IP network can offer a constant bit-rate service type (using the Resource Reservation Protocol (RSVP)), and a best efforts service type. Another service type gives packets sent by one class of users priority over packets sent by another class of user. Using RSVP, a user can additionally specify the amount of bandwidth he or she wishes to have available.

Where a person has to make such a service specification many times because he or she is involved in a number of different communications and/or has to make a plurality of service specifications during a communication, it is beneficial if that specification is made on that person's behalf by a computer programmed to act as that person's agent.

The present invention concerns how the computer acting as an agent determines the data rate request for the user.

During the last five years not only has the amount in Internet traffic increased dramatically, but there has also been a significant diversification in the type of traffic flowing through computer networks. Until fairly recently, file transfer, email and simple web traffic formed the almost all the data flows on the Internet. Now applications may include multi-party and/or multi media data transmission. Such applications include "real-time" audio and video, interactive games, instant messaging, multi-party virtual worlds, network games, auctions, audio and video-conferencing and IP telephony.

In view of the increase in data transmission, efficient control and management of the network resources is becoming increasing important. One of the problems faced by network users and service providers is congestion, a situation in which there is too much data for the network to handle. The consequence of which is delays or even loss of data.

Traditionally, rate control in the Internet is taken care of by the Transmission Control Protocol (TCP). TCP is described in many references places, for example, "Fred Halsall, Data communications, computer networks and open systems, $6^{th}$ ed., Addison-Wesley, 1995. TCP is a window based rate control algorithm, i.e. window based rate control is achieved by limiting the amount of data that can be in the network at any one time. TCP is stable and normally makes fairly efficient use of the available bandwidth, and distributes network resources fairly between different users. For file transfer and email, TCP performs well because, provided the file or email arrives within a reasonable time at its destination, it is not important at which rate the data was transmitted. However, TCP rate control gives rise to fluctuations in the transfer rate that are unacceptable for applications where the rate of data transmission is important, for example, real time applications, such as video and audio streaming. The reason for this is that if a single packet is lost the congestion window is halved. Further TCP guarantees that lost packets will be retransmitted until they arrive at the receiver. For some applications including real-time multimedia applications, this is not necessary. Problems with rate fluctuations which occur in networks running TCP have made it necessary to develop alternative rate control algorithms. It is believed that in time TCP will become a less preferred option, as it becomes less able to deal with the greater variety of services users demand.

Further, as congestion on the Internet increases, network managers are looking for alternative ways to manage it. Also, multimedia multi-party internet protocol (IP) applications, such as those mentioned above, can be very demanding in terms of their Quality of Service (QoS) requirements. Standards are being developed to ensure that network resources can be applied where they are most needed. However, problems still surround how the demand for different classes of QoS should be managed.

One solution to this problem may be congestion based pricing. The underlying idea being to charge users or, on a more abstract level, to charge applications. The charge may be either in terms of real currency or in some other terms, for example fictional currency. The charge is made for the network resources used. Also the charge increases depending on the level of network congestion. When bandwidth becomes scarce, the charge will increase, when congestion reduces the charge is decreased. This gives users, or applications, the incentive to back off the network at times of network congestion. Congestion based pricing is discussed by F. P. Kelly in "Charging and rate control for elastic traffic", European Transactions on Telecommunications, vol. 8, pp33-37, January 1997.

Conventional rate control techniques are based on variables which reflect network performance, such variables include packet loss or roundtrip time. Price based approaches exploit "shadow prices" (an expression borrowed from economics which is applied to situations where actual prices cannot be charged, or where actual prices do not reflect the real sacrifice made when some activity is pursued. Shadow prices are used in valuing any item, such as a network resource, which is implicitly rationed or constrained in some way.) and user determined policies that specify how much the user values the data rate they get from the network. One way of expressing this variable is the user's willingness to pay for a particular service.

One such priced based technique for managing congestion is discussed in "F P Kelly, A K Maulloo, and D K H Tan, Rate control for communication networks: Shadow prices, proportional fairness and stability, Journal of the Operational Research Society 49 (1998), no. 3, 237-252". In this paper, Kelly et al propose an "equation based algorithm". Equation based algorithms are so called because they differ from window based algorithms, such as TCP, in that the sending rate is determined directly (without any other external constraints) using a mathematical equation. Contrary to window based rate control, equation based rate control does not place an explicit limit on the amount of outstanding data (data that has left the sender, but has not arrived at the receiver yet). At present, TCP, a window based algorithm, is not able to support such alternative equation based algorithms for rate control.

The equation based rate control algorithm proposed by Kelly et al is known as the "primal" algorithm. The primal algorithm determines the request for a data rate which a user sends to his service provider, when requesting a download of data. The primal algorithm is an adaptive system which takes user determined parameters, such as the user's willingness to pay for a service together with network manager determined parameters, such as the price charged by the resource per unit flow, and network determined parameters, such as the transfer rate of the flow along a particular route and the congestion price, to determine the sending rate request which the user sends to his service provider.

The primal algorithm has been shown to be stable. However, the rate of convergence, that is the rate at which the algorithm reaches a stable rate, is a particular problem with the primal algorithm. This causes problems in particular, at the beginning of a download, where it takes the primal algorithm too long to go from a very low data rate to the desired data rate, and in situations where congestion is to be avoided, where the user desires a relatively low data rate, with however, little variation.

The present invention provides a solution to the problems identified above with respect to resource control in data transmission.

SUMMARY

According to an exemplary embodiment, there is provided a method of controlling the rate of data transmission from a source of data to a user via a communications link, wherein processing means are provided to generate a signal representing a rate request which will be used in determining the rate at which data will be transmitted from the source to the user, said processing means generating the signal by carrying out the steps of: obtaining an indication of the amount of congestion on said communications link, selecting a value indicative of the user's willingness to pay for a given transmission data rate, and determining the rate to be requested as a function of the indication of the amount of congestion and the user's willingness to pay weighted by a variable parameter, the processing means thereafter communicating the signal to the source of data and the rate of the data transmission from the data source to the user then being controlled on the basis of the signal.

The inventors have realised that by weighting a function of the user's willingness to pay and an indication of the congestion to determine a data rate to be requested, the data rate requested can be controlled more efficiently. This enables improved allocation of resources of the network over prior art systems.

Preferably (but not necessarily), the rate to be requested is determined using the following iterative equation:

$$X_{n+1} = x_n + \text{delta} * \text{kappa} * x_n^\xi (w - x_n * \mu)$$

where $x_n$ is the data transmission rate (bits per second) as calculated at an nth iteration; and $x_{n+1}$ is the rate to be determined; $x_n * \mu$ is the charge to the user indicative of amount of congestion and is the product of $x_n$ and congestion charge $\mu$; w is the willingness to pay; delta is the time elapsed between two iterations; kappa is a constant gain parameter; and $\xi$ (xi) is a parameter whose value is set depending on the indication of congestion or the user's willingness to pay.

This has the advantage of enabling the rate controller to adopt different policies depending on the user's preferences and the network conditions. The data rate requests will have different values depending on the users preferences and the network conditions. The possible policies differ by their reactivity speed to sudden changes to the congestion level.

According to a further aspect of the present invention, there is provided a rate controller for controlling the rate of data transmission from a source to a user via a communications link, said rate controller including processing means for generating a signal representing a rate request which will be used in determining the rate at which data will be transmitted from the source to the user, said processing means including means for obtaining an indication of the amount of congestion on said communications link, selecting means for selecting a value indicative of the user's willingness to pay for a given transmission data rate, determining means for determining the rate to be requested as a function of the indication of the amount of congestion and the user's willingness to pay weighted by a variable parameter, the processing means further including means for communicating the signal to the source, wherein the rate of the data transmission from the source to the user is controlled on the basis of the signal.

According to a further aspect of the present invention, there is provided a method of controlling the rate of data transmission from a source of data to a user via a communications link, wherein processing means are provided to generate a signal representing a rate request which will be used in determining the rate at which data will be transmitted from the source to the user, said processing means generating the signal by carrying out the steps of:

obtaining an indication of the amount of congestion on said communications link, selecting a value indicative of the user's willingness to pay for a given transmission data rate, determining the rate to be requested on the basis of the ratio of said value to said indication of the amount of congestion on said communications link.

The inventors have realised that by assessing the ratio of a user determined parameter and the indication of the congestion on the network to determine a data rate request, the rate of convergence of the system is dependent only on the congestion level. This has the advantage that the rate control method does not affect the stability of the network.

Preferably (but not necessarily), the method of controlling the rate of data transmission determines the rate to be requested in accordance with the following equation:

$$x_{n+1} = x_n + \delta * \kappa * \left(\frac{w}{\mu} - x_n\right)$$

where $x_n$ is the data transmission rate (bits per second) as calculated at an nth iteration and $x_{n+1}$ is the rate to be determined; $\mu$ is the congestion charge indicative of amount of congestion; w is the willingness to pay; delta is the time elapsed between two iterations; and kappa is a constant gain parameter.

Further according to another aspect of the present invention, there is provided a rate controller for controlling the rate of data transmission from a source to a user via a communications link, said rate controller including processing means for generating a signal representing a rate request which will be used in determining the rate at which data will be transmitted from the source to the user, said processing means including means for obtaining an indication of the amount of congestion on said communications link, selecting means for selecting a value indicative of the user's willingness to pay for a given transmission data rate, determining means for determining the rate to be requested as on the basis of the ratio of the user's willingness to pay to said indication of the amount of congestion on said communications link, the processing means further including means for communicating the signal to the source, wherein the rate of the data transmission from the source to the user is controlled on the basis of the signal.

Both apparatuses summarised above are preferably embodied in a general purpose computer, suitably programmed.

This invention also extends to a computer programmed to perform the method of the invention, and to a computer program product loadable into the internal memory of a digital computer, comprising software code portions for performing the steps of the method of the invention, when said product is run on a computer.

BRIEF DESCRIPTION OF THE DRAWINGS

By way of example only, specific embodiments of the present invention will now be described with reference to the accompanying Figures in which.

DETAILED DESCRIPTION OF EXEMPLARY EMBODIMENTS

Figure 1:
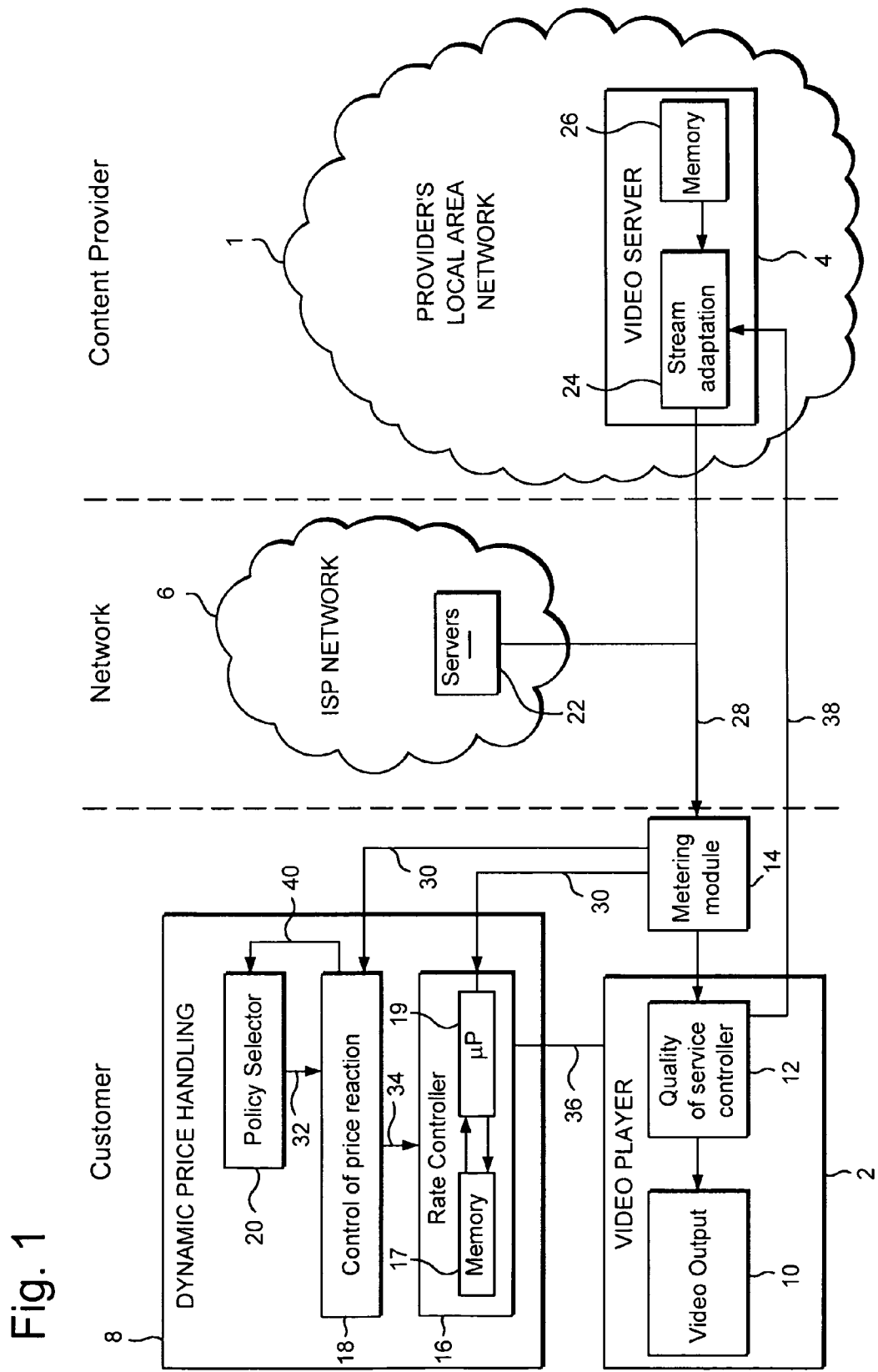
FIG. 1 shows schematically the basic components of a general purpose computer disposed in a network connected to a content provider, capable of performing the invention.

FIG. 1 shows an internetwork comprising a content provider's local area network 1 connected to a customer end configuration via an internet service provider's (ISP) network 6. The content provider's local area network 1 includes a video server 4 having a stream adaptation module 24 and a memory 26 where the video data is stored. It is not essential that the memory 26 be located at a particular video server. The memory 26 may be remote from the server 4. The customer end includes a video play 2 (with video output 10) and a dynamic price handling module 8, and a portion of the global Internet 6 with servers 22 which interconnects the user with the content provider.

BACKGROUND OF THE PREFERRED EMBODIMENTS

In the preferred embodiment described below, reference is made to transmission of video data. However, the invention is not limited in this respect and may be applied to the transmission of any data. As mentioned above, the present invention has particular application to real time data such as video, audio data as well as interactive and multiparty applications.

FIG. 1 shows an internetwork comprising a content provider's local area network 1 connected to a customer end configuration via an internet service provider's (ISP) network 6. The content provider's local area network 1 includes a video server 4 having a stream adaptation module 24 and a memory 26 where the video data is stored. It is not essential that the memory 26 be located at a particular video server. The memory 26 may be remote from the server 4. The customer end includes a video player 2 and a dynamic price handling module 8, and a portion of the global Internet 6 (with servers 22) which interconnects the user with the content provider.

The internetwork in FIG. 1 is suitable for use with methods for controlling congestion, such as congestion based pricing. The congestion level in the network is signalled to the user, for instance, by using the explicit notification protocol (ECN). The ECN protocol is standardised as part of the IETF Standard Track as RFC 3168[21], and is the subject of the Market Managed Multiservice Internet (M31) Consortium, a multi party collaboration including the applicants. For more information on the M31 Consortium reference is made to http://www.m3i.org.

When a user sends a request for a download of data to the content provider, the internetwork shown in FIG. 1 responds as described below. The content provider receives the request and when the data is ready for transmission begins to transmit data to the user via the network. The network provider linking the content provider to the user randomly mark data packets on its network. The larger their data rate, i.e. the number of packets per unit time, the higher the probability will be that a packet is marked. Thus the number of marked packets received at the user end will be indicative of congestion level. Marking of data is done in accordance with the explicit congestion notification protocol, which has been standardised as part of the IETF Standard Track as RFC 3168[21].

The marks in the data are detected at the user end of the network by a metering module 14. The location of the metering module 14 is not important provided it is disposed between the content provider and the user. For example, it may be disposed within the network or at the user's end.

The metering module 14 produces an estimate of the marking rate for the data destined for the user, which is the ratio of marked packets among the received packets over an observation period.

The user is charged an amount for each marked packet in the data stream received. This charge may bear a real monetary value and later be used to actually charge the user. Alternatively, the price per mark may also remain a fictional charge and simply represent an indication of the amount of data on the network, i.e. the level of congestion. If there is enough traffic with one user on the connection, then the number of marks will be an indication of the congestion on the network, that is the total amount of traffic on the network. Thus the congestion indication may represent a symbolic incentive for the user to reduce her consumption of the network's resource. In any case, the marking rate reflects the current congestion level in the network and is the main dynamic input to the control means 18 at the user's end to the control the data rate of the connection and thereby optimise the utility of the customer. The price charged by the network is proportional to the congestion level. The charge for the user is based on the product of the price charged by the network and the amount of data sent or received by the user.

DETAILED DESCRIPTION OF THE EMBODIMENTS

The present invention is preferably embodied in a rate controller 16, comprised within a dynamic price handling (DPH) agent 8. In the example, shown in FIG. 1, the DPH agent is located at the user's end. This arrangement is preferable, however, the invention is not limited in this respect, and the DPH agent 8 may be located anywhere within the internetwork provided the user's preferences can be input to it, and provided its output can be transmitted onto the network. In particular, DPH may be located at the content provider's end.

The role of the DPH is to perform the rate control of the data stream the user is interested in. When the user sets up a connection she specifies her control policy 32. Then for the duration of the connection, the DPH monitors the evolution of the marking rate 30 and—when necessary—requests that the data rate delivered to the user over the network to be adjusted to a new target rate 36. The delivery process itself may be carried out according to any method as long as it provides a working interface for rate control purposes. The improvement achieved by the present invention is to have a configurable rate control based on the congestion marks signalled by the network rather than a default rate control based on packet losses.

The marking rate is retrieved from the metering module 14, it represents the proportion of marked packets within the data stream during a period and is expressed in marks per packet. This period will not necessarily be the same for input to the price reactor 18 and to the rate controller 16.

The adjustment request from the rate controller is communicated to the server 4 via the quality of service controller 12 of the video client 2 over the control channel 38. The stream adaptation module 24 of the video server will adjust the data sent to the user accordingly.

The DPH agent 8 is now described in greater detail. Within the DPH agent 8 three main functions are performed: the policy selection, the price reaction and the rate control. While the policy selection is done mainly before the service is delivered to the customer, the price reaction and rate control are carried out during the duration of the connection. It may also be updated occasionally as the service is provided. The price reaction and rate control however, are performed continually while the service is being delivered, with the price reaction preferably, being performed on a longer timescale than rate control.

When a connection is set up for download of data to a user, the user defines her strategy, i.e. how she will react to changes in the congestion indication (or congestion price). This is done by selecting a buying policy reflecting her needs using the policy selector 20. A default policy, or more usually a selection of popular or commonly used policies, is provided by the content provider when the connection is set up, but the user is able to customize her buying policy to accommodate her preferences. The buying policy defines the demand function 32 of the user, and is used by the price reactor to determine the requested data rate. The demand function is the relationship between a given congestion indication (or congestion price) and the data rate the user is willing to accept for that congestion indication. Having selected a buying policy, the DPH agent is able to handle the transmission control on behalf of the user for the rest of the session. If the user wishes, however, the buying policy may be changed during the session.

The policy selector allows the user to define how she would like the DPH to react to the congestion signal by choosing an adequate user policy. The user will always have to choose her policy when the connection is set up and she may modify or change it during the session. The default policy is adopted if the user does not want to configure the DPH. The user policy is the only input the DPH needs from the user to handle the rate control of the connection on the user's behalf.

The policy selector 20 translates the user policy into a demand function 32 that gives the optimal rate the DPH should request for any congestion shadow price. A typical demand function is a decreasing function of the congestion price: the more congested the network, the less the user is willing to create traffic. In the implementation of the DPH, the decreasing function is represented as a set of points that give the value of the demand function for a number of values of the congestion price. The value of the demand function 32 for other congestion prices is obtained by linear interpolation.

The price reactor module 18 periodically establishes the willingness to pay 34 of the user according to the user's demand function 32 obtained from the policy selector 20, and to the marking rate 30 reported via the metering module 14. In addition, the price reactor 18 infers an estimate of the congestion shadow price in the network from the marking rate 30 reported via the metering module 14. This estimate reflects the congestion level in the network.

The function of the rate controller 16 is to reach the optimal transmission data rate as smoothly as possible to avoid compromising the stability of the network. Consequently, the rate control module 16 monitors the congestion indication (or congestion price) on a shorter timescale than the price reactor 18 does. This is achieved using the rate control algorithm of the present invention, described in detail below In the embodiment shown in FIG. 1, the rate controller 16 determines which streaming data rate is to be requested, and communicates it to the quality of service controller which is embedded in the video player 2, which sends a request message. The decision to request a data rate adaptation is performed by the quality of service controller, which sends a request to the content provider. However, it is not essential that the quality of service controller handles the communication to the content provider's server. The rate controller 16 may also communicate the request data rate to the content provider.

FIG. 1 also shows the main components of the DPH agent 8 and how they interface together. The policy selector 20, with which the user interacts, inputs the demand function 32 to the price reactor 18 at the start of the session. During the whole duration of the session, the marking rate 30 is communicated to the price reactor 18 and the rate controller 16. At regular time intervals, the price reactor 18 updates the willingness to pay 34 which is communicated to the rate controller 16. Periodically, according to the willingness to pay and the congestion price estimate (determined from the marking rate), the rate controller selects a new target data rate 36, which the rate controller 16 or quality of service controller communicates to the content provider. Overall, the DPH agent 8 therefore, determines the adaptation signal for the data rate on the connection from the congestion indication signalled by the marking rate.

The dynamic inputs to the DPH agent 8 are the marking rate, the price per mark and the demand function which includes the willingness to pay. However, usually, the price per mark and the demand function will not vary during a session.

The marking rate is retrieved from the metering module 14 and represents the proportion of marked packets within the data stream during a period. This period will not necessarily be the same for the input to the price reactor 18 and to the rate controller 16.

The demand function 32 is communicated from the policy selector 20 to the price reactor 18. The price reactor 18 determines the optimal streaming rate in bits per second for a set of discrete values of the congestion indication in marks per bit. The value of the demand function 32 for any congestion price is obtained by linear interpolation.

The willingness to pay 34 is determined by the price reactor 18 and communicated to the rate controller 16.

The target rate 36, expressed in bits per second, is preferably communicated to the quality of service controller 15 for further communication to the stream adaptation module 24 at the content provider's server 4.

With respect to the components of the DPH agent, the following additional description is given.

The Policy Selector

The policy selector 20 produces the user's selected policy which contains the demand function of the user, inferred from the utility function. For further details on how the demand function is extracted from the utility function, reference is made to "B. Briscoe, "Price Reaction Design", Deliverable 3.2 (July 2000), M31 EU Vth Framework Project IST-1999-11429 http://www.m3i.org.

The demand function is the relationship between the user's optimal preferred data rate and the estimated congestion price.

Figure 2A:
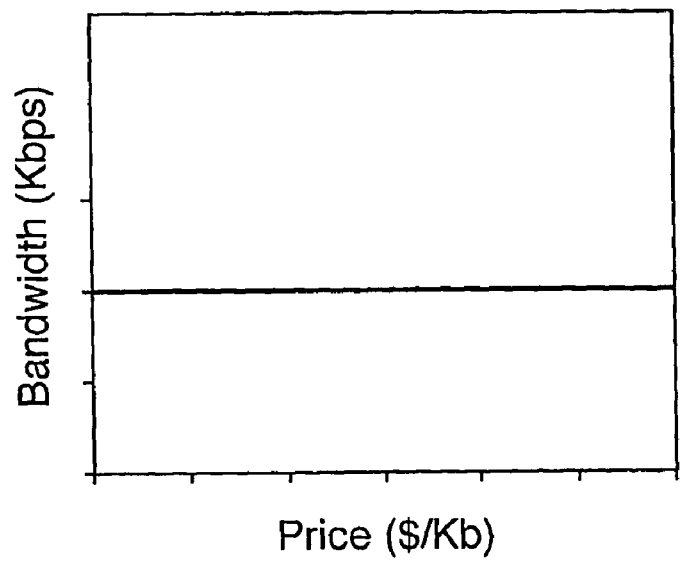
FIGS. 2a and 2b show demand functions.

By way of explanation, FIG. 2 shows two demand functions. FIG. 2a is a demand function whose purpose is to demand a constant data rate regardless of the congestion price. So, however high the congestion price, the user is prepared to pay in order to maintain her optimal data rate. The user policy related to this demand function is referred to as "constant quality of service". In terms of utility function, the "constant quality of service" policy is a step form, i.e. the customer has no use of the data unless it is received completely.

Figure 2B:
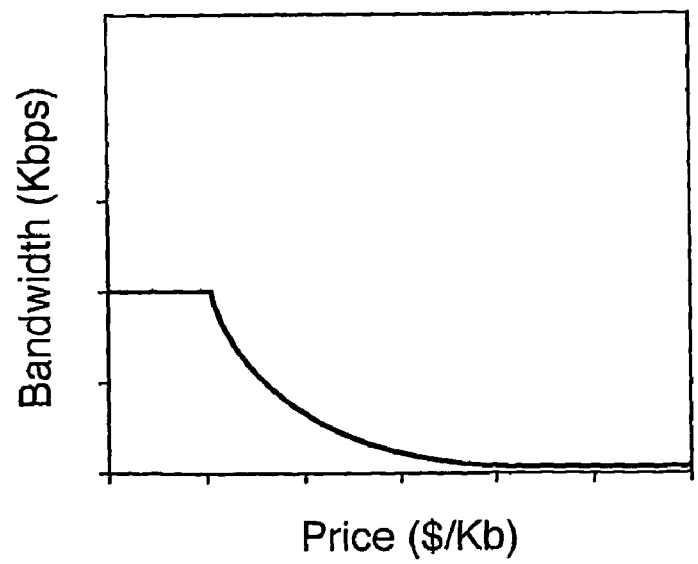

FIG. 2b shows a demand function which is intended to keep the charging rate constant over a period of time (the amount of money charged to the user for the data transmitted over a unit of time). The policy related to this demand function is referred to as "constant charge". In terms of utility function, the "constant charge" policy corresponds to a user with a logarithmic utility for the bandwidth. It is added that the invention supports a wide variety of policies and is not limited in this respect. Further, any policy can be customised to accommodate a user's preference. The two policies discussed above, however, represent two of the most preferred policies.

The Price Reactor

The price reactor takes the user's policy which defines the demand function D(p) with respect to the shadow congestion price to determine the user's willingness to pay.

The marking rate from the metering module 14 is the primary dynamic input to the price reactor 18. The marking rate is evaluated by the price reactor 18 on a periodic basis.

The first step (1) is to obtain the congestion price. The congestion price, p(·), in charging unit per bit is inferred from the marking rate, m(·), in marks per bit, and the price per mark, ppm, in charging unit per mark.

(1) p=m*ppm, where p is the congestion price as a function of time, m is the marking rate as a function of time, and * hereinafter means multiplied by.

The second step (2) is for the price reactor to determine an intermediate target rate in bits per second.

(2) target_rate=D(p).

The third step is to determine the willingness to pay, w, from the target rate.

(3) w=target_rate*m.

The willingness to pay is communicated to the rate controller.

Rate Controller

The rate controller 16 includes a memory 17 for storing the requested data rates and a processor. The rate controller 16 determines the data rate that is to be requested to the content provider on the basis of the willingness to pay of the user, the instantaneous congestion price and the data rates available from the content provider's server 4.

The rate controller 16 calculates the optimal data rate using a rate control algorithm according to the present invention. The rate control algorithm enables an optimal target rate to be calculated in order to adapt to changing congestion conditions without putting the network stability at risk.

The rate control algorithm used by the rate controller 16 is:

$$x_{n+1} = x_n + delta*kappa*X_n^{\xi}(w-x_n*\mu) \quad (4)$$

where $x_n$ is the current target rate in bits per second as calculated at the nth iteration; $\mu$ is the congestion charge and is determined from the marking rate obtained from the metering module 14; w is the willingness to pay as updated by the price reactor 18; delta is the length of the metering cycle in seconds; kappa is a constant; and $\xi$(xi) is a parameter having a value between −1 and +1. $\xi$ is discussed fully below. It is noted that $\mu$ in Formula (4) is used to give an indication of the congestion, and does not necessarily have any monetary implication.

It is further added that kappa is constant and represents the ability of the system to adapt to a change in the requested data rate. Kappa, also denoted as κ in the text below, is referred to as the adaptation gain, that is the nominal speed of reaction. The tuning of kappa reflects the compromise between reactivity and stability. The higher the value of kappa, the swifter the reaction of the system (at the risk of causing instability). The lower the value of kappa, the more stable the data rate will remain (at the risk of barely adapting to a different requested data rate). If, for example, kappa were 0, the data rate would remain constant and would not adapt in spite of the requested data rate.

Formula (4) represents a discretisation of a system of differential equations underlying the present algorithm as discussed below, and shown below in equation (5).

Theoretical Background

In order to fully appreciate the exemplary embodiment, some theoretical background of the rate control algorithm of the present exemplary embodiment is given in this section.

For background, reference is made to "F P Kelly, A K Maulloo, and D K H Tan, Rate control for communication networks: Shadow prices, proportional fairness and stability, Journal of the Operational Research Society 49 (1998), no. 3, 237-252", which sets out the primal algorithm and the concepts of stability and fairness of a system governed by an equation based congestion algorithm.

The inventors of the subject application have deduced that the non-time delayed version of the primal algorithm is globally stable and proportionally fair, but the global stability is not guaranteed when time lags are taken into consideration. The inventors have found out that the kappa parameter in the algorithm is crucial: it has to be sufficiently small to achieve an acceptable level of local stability. However, setting kappa to the low values required to attain stability, results in a painstakingly slow convergence, which is also not acceptable. The inventors have found, that in fact, the rate of convergence in general in the primal algorithm is problematic. The lack of a mechanism like the slow-start in TCP is partly responsible for these problems. (It is noted that the name "slow-start" in TCP is counterintuitive: during "slow-start" the transfer rate actually changes very rapidly, not slowly, in order that the data rate reaches the optimum rate as quickly as possible. This nomenclature has its roots in TCP's history.)

The algorithm of the present exemplary embodiment overcomes the problems with the primal algorithm. It is able to operate in different phases, like "slow-start", i.e where the data rate changes rapidly, and congestion avoidance, i.e. where the data rate is kept constant. The algorithm of the present invention is referred to hereinafter as the ξ(xi) algorithm and is named after one of its parameters, which determines the "phase", i.e. the mode, in which the algorithm operates.

In the sections below, the ξ(xi) algorithm is presented and, some theoretical results on its stability and fairness are derived. Also, the presence of the ξ parameter, that allows the algorithm to operate in different phases is discussed. This discussion includes the discussion of phase transitions, that is when to move from one phase to another.

ξ(xi) Algorithm

To present the ξ algorithm, a mathematical model is required. Let J be a set of network resources, and $c_j$ the (finite) capacity of resource j, for j∈J. Furthermore, take $R \subseteq P(J)$, the set of possible routes, and $x_r$, r∈R, the transfer rate of the flow through route r.

Let $A=(A_{jr}, j \in J, r \in R)$, where $A_{jr}=0$ if j∉r and 1 if j∈r.

A vector of transmission rates $x=(x_r, r \in R)$ is feasible if x is greater than or equal to 0 and Ax is less than or equal to c.

In addition, the functions $p_j(\cdot)$, j∈J, where $p_j(y)$ is the price charged by resource j, per unit flow, when the total flow through resource j is y. Finally, take $W=(w_r, r \in R)$, the amounts users are willing to pay per unit time for each route, and kappa, the gain factor discussed above.

The ξ algorithm can now be described by the system of differential equations:

$$\frac{d}{dt} x_r(t) = \kappa x_r(t)^\xi \left( w t p_r - x_r(t) \sum_{j \in r} m_j(t) \right) \quad (5)$$

where the summation is over a set of routes, and where $$m_j(t) = p_j \left( \sum_{s: j \in s} x_s(t) \right) \quad (6)$$

where the summation is over all routes ξ which contain resource j and where 4 is the reactivity parameter, as discussed below.

It is assumed above that r ranges over R and j over the set J.

As mentioned previously the prices $p_j(\cdot)$ need not be prices in the strict sense of the word. The may, as mentioned, represent the level of congestion feedback from the network via the metering module 14.

It is observed that when ξ=0, the behaviour of the ξ algorithm is identical to that of the primal algorithm. However, when ξ is set to a value greater than zero, the algorithm is more aggressive than a standard additive increase, multiplicative decrease (AIMD) algorithm, and more resembles TCP's behaviour during "slow-start". On the other hand, when ξ is less than zero, the transfer rate is kept almost constant, changing very slowly indeed. A more detailed analysis of how the algorithm's behaviour depends on ξ is given below.

Stability and Fairness of the ξ Algorithm

Stability and fairness are two important criteria applied to congestion algorithms to assess their performance.

An algorithm is regarded as being stable if it has a stable operating point, that is a situation in which the transfer rate is kept constant under constant network conditions. An algorithm is regarded as having global stability if the stable operating point is reached automatically after a certain amount of time. Furthermore, an algorithm is regarded as having local stability if, after a stable situation has been reached, small perturbations of the network conditions, do not affect the stable operating point. And finally, assuming that an algorithm will converge to a stable operating point, what is the rate of convergence, that is how long does it take before a stable situation is reached.

The concept of fairness pertains to situations where a number of flows share network resources. In real life situations, these resources are generally limited. Fairness is concerned with each flow getting its "fair share" of the available resources. What exactly is meant by "fair" depends on the sort of fairness used, as there are different criteria for assessing fairness. The type of fairness used to assess the 4 algorithm is proportional fairness.

The inventors have shown that the ξ algorithm exhibits good stability and fairness. These two properties were considered by Kelly et al in "F P Kelly, A K Maulloo, and D K H Tan, Rate control for communication networks: Shadow prices, proportional fairness and stability, Journal of the Operational Research Society 49 (1998), no. 3, 237-252". The inventors have applied the criteria of stability and proportional fairness defined in Kelly et al's paper to the ξ algorithm.

In order to appreciate how the stability of the ξ algorithm has been determined theoretically, Lyapunov's second method is referred to. For the sake of completeness a brief discussion of Lyapunov's second method is given below. Reference is made to "William E Boyce and Richard C DiPrima, Elementary differential equations and boundary value problems, $6^{th}$ edition, John Wiley & Sons, Inc" for a fuller explanation of this method.

Lyapunov's second method is used to establish the stability or otherwise of systems of differential equations, such as those set out above in equations (5) and (6) representing the present invention, and is as follows: Given an autonomous system of differential equations $$\frac{dx_1}{dt} = F_1(x), \frac{dx_2}{dt} = F_2(x), \ldots \frac{dx_n}{dt} = F_n(x) \quad (7)$$

and a function V(x), defined on some domain D containing the origin, define the function $V^Y$:

$$V^Y(x) = \frac{\partial V}{\partial x_1}(x)F_1(x) + \frac{\partial V}{\partial x_2}F_2(x) + \ldots + \frac{\partial V}{\partial x_n}(x)F_n(x) \quad (8)$$

Note that $V^Y$ depends on the system of differential equations set out in equations (7). For convenience, the following definition is introduced:

Lyapunov function: consider the system of differential equations (7) and assume that it has an isolated critical point $\hat{x}$. A function $V(x)$ that is continuous, has continuous partial derivatives, has a global maximum at $\hat{x}$, and for which $\dot{V}(x-\hat{x})$ is positive definite on some domain D containing the origin, is called a Lyapunov function for the autonomous system represented by equations (7).

Using this definition the following theorem can be stated (proof omitted):

Theorem 1: suppose that the autonomous system represented by equations (7) has an isolated critical point $\hat{x}$. If there exists a Lyapunov function V for this system, then $\hat{x}$ is an asymptotically stable critical point. If the function $\dot{V}(x-\hat{x})$ given in the definition above is positive semidefinite instead of positive definite, then the origin is a stable critical point.

To assess the stability of the $\xi$ algorithm Kelly's approach was used. Thus, the following formula is defined:

$$U(x) = \sum_{r \in R} w_r \ln x_r - \sum_{j \in J} \int_0^{\sum_{s:j \in s} x_s} p_j(y) dy \quad (9)$$

Where $U(x)$ is the user's utility function, from which the demand function, as discussed above, is derived.

It is assumed that $w_r > 0$, $r \in R$, and that for $j \in J$ the functions $p_j(y)$, where $y \geq 0$, are non-negative, not identically zero, continuous, and increasing.

The following Theorem 2 is proposed: the continuous, strictly concave function $U(x)$ is a Lyapunov function for the system of differential equations (5) and (6). The unique value x maximising $U(x)$ is an asymptotically stable point of the system.

The following proof is given: it follows from the assumptions on $w_r$, $r \in R$, and $p_j$, $j \in J$. that $U(x)$ is strictly concave on $x \geq 0$ with an interior maximum. Hence, the maximising value of x, which we shall call $\hat{x}$, is unique.

Observe that U has continuous partial derivatives, and that $$\frac{d}{dt} U(x(t)) = \sum_{r \in R} \frac{\partial U}{\partial x_r} \frac{d}{dt} x_r(t) \quad (10)$$

$$= \kappa \sum_{r \in R} \frac{x_r(t)^\xi}{x_r(t)} \left( w_r - x_r(t) \sum_{j \in r} p_j \left( \sum_{s:j \in s} x_s(t) \right) \right)^2,$$

establishing that $$\frac{d}{dt} U(x(t) - \hat{x})$$

is a positive definite on some domain containing the origin.

It is thus shown that U is a Lyapunov function for the system represented by equations (5) and (6).

Application of Theorem 1 yields the second part of the Theorem.

To assess the fairness of the $\xi$ algorithm the following Kelly definition of proportional fairness was used.

Suppose that the network has a set of J resources, and let $c_j$ be the finite capacity of resource j, for $j \in J$. Furthermore, take $R \subseteq P(J)$, the set of possible routes, and $x_r, r \in R$ the transfer rate of the flow through route r. Finally we define $A = (A_{jr}, j \in J, r \in R)$, where $$A_{jr} = 0 \text{ if } j \notin r \text{ and } 1 \text{ if } j \in r. \quad (11)$$

A vector of sending rates $x = (x_r, r \in R)$ is feasible if $x \geq 0$ and $Ax \leq c$.

Proportional fairness is defined as follows: A vector of rates x is proportionally fair if it is feasible, and if for any other feasible vector $\hat{x}$, the aggregate of proportional changes is zero or negative:

$$\sum_{r \in R} \frac{\hat{x}_r - x_r}{x_r} \leq 0. \quad (12)$$

Without showing proof, the following Theorem 3 is stated from "Jean-Yves Le Boudec, Rate adaptation, congestion control and fairness: A tutorial.".

Theorem 3: For every network situation there exists a unique proportionally fair allocation. It is obtained by maximising $$\sum_{r \in R} \ln x_r.$$

Theorem 3 is particularly useful because it gives a practical way of computing a proportionally fair allocation. Simply maximising the function $$\sum_{r \in R} \ln x_r.$$

suffices

Figure 3:
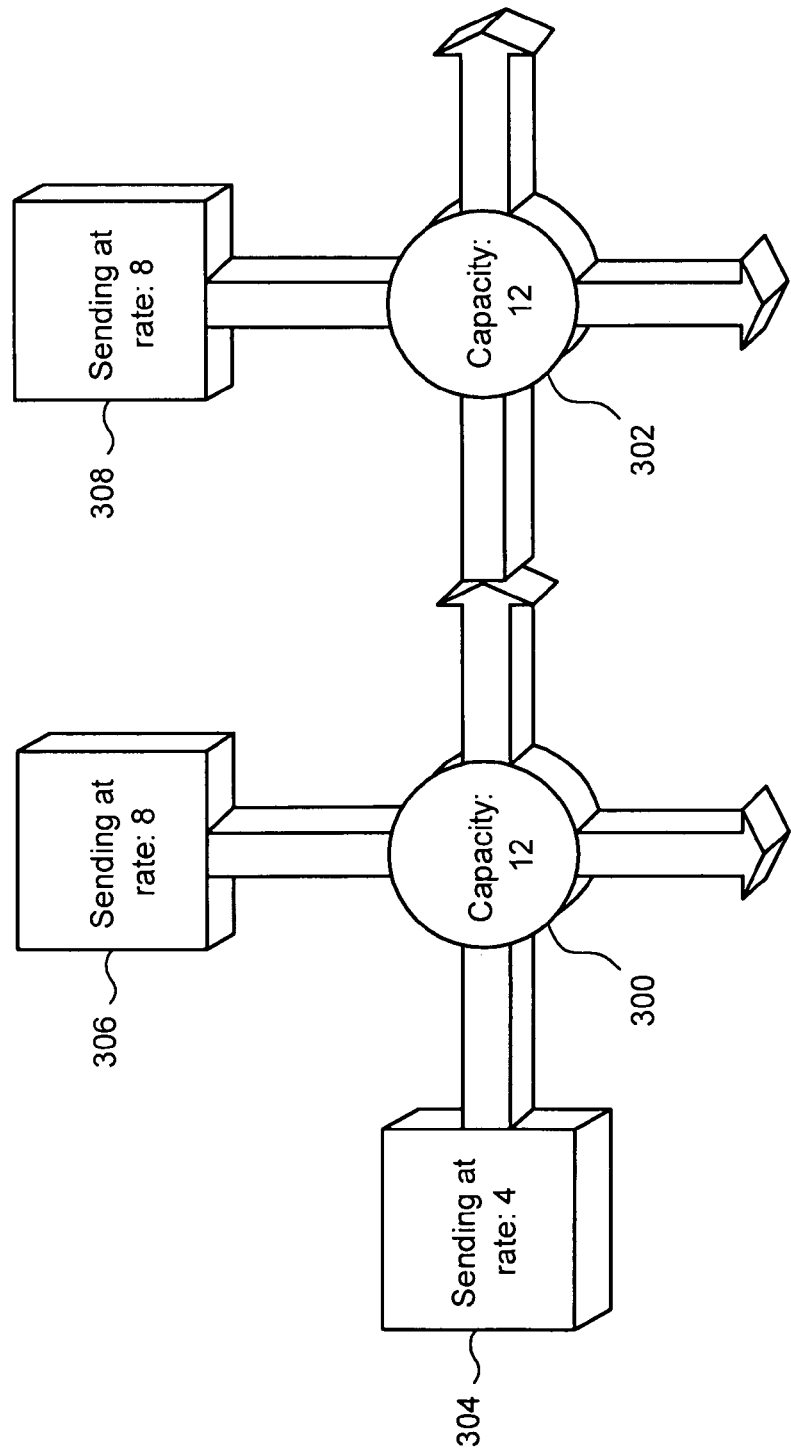
FIG. 3 illustrates an example of a network including users and content providers where the concept of proportional fairness is applied.

FIG. 3 illustrates proportional fairness using a network with two resources 300, 302 and three users 304, 306 and 308. Both resources 300, 302 have capacity 12 (arbitrary units). The proportionally fair allocation is shown: user 304 has 4 units, users 306 and 308 have 8 units. Proportional fairness gives priority to small flows.

An extension to the proportional fairness concept is the idea of weighted proportion fairness. The definition is as follows: A vector of rates x is proportionally fair if it is feasible, and if for any other feasible vector $\hat{x}$, the aggregate of weighted proportional changes is zero or negative:

$$\sum_{r \in R} w_r \frac{\hat{x}_r - x_r}{x_r} \leq 0 \quad (13)$$

with $w = (w_r, r \in R)$ a vector of weights, n.b. w here is not to be confused with the willingness to pay, shortened to w.

Theorem 3 can be adapted to cover weighted proportional fairness. It is now necessary to maximise $$\sum_{r \in R} w_r \ln x_r.$$

It is to be noted that the uniqueness of the solution is not guaranteed any longer, but depends on the weighting vector, w.

Theorem 4: the functions $p_j, j \in J$, may be chosen such that the vector x maximising $U(x)$ approximates arbitrarily closely a vector of rates that is weighted proportionally fair, with vector of weights w.

The following proof of Theorem 4 is given: let the functions $p_j, j \in J$, be defined as $$p_j(y) = (y - c_j + \varepsilon)^+ / \varepsilon^2 \qquad (14)$$

where pj is a price function and E dictates the slope of the price functions. (The superscript+indicates that if the quantity within the brackets has a negative value, then it takes the value zero, and if the quantity within the brackets is positive, then it keeps its positive value.)

These functions are continuous. As $\epsilon \to 0$, the vector maximising $U(x)$ approximates arbitrarily closely the solution of the fairness problem $$\max \sum_{r \in R} w_r \ln x_r \qquad (15)$$

subject to $Ax \leq c$ over $x \geq 0$.

Hence, by Theorem 3, set out above, x is proportionally fair per unit charge.

It is important to note that both Theorems 2 and 4 remain valid when a different value for $\xi$ is taken for each route or user, that is taking $\xi = (\xi_r), r \in R$ instead of just $\xi$.

The $\xi$ algorithm and phases

Figure 5:
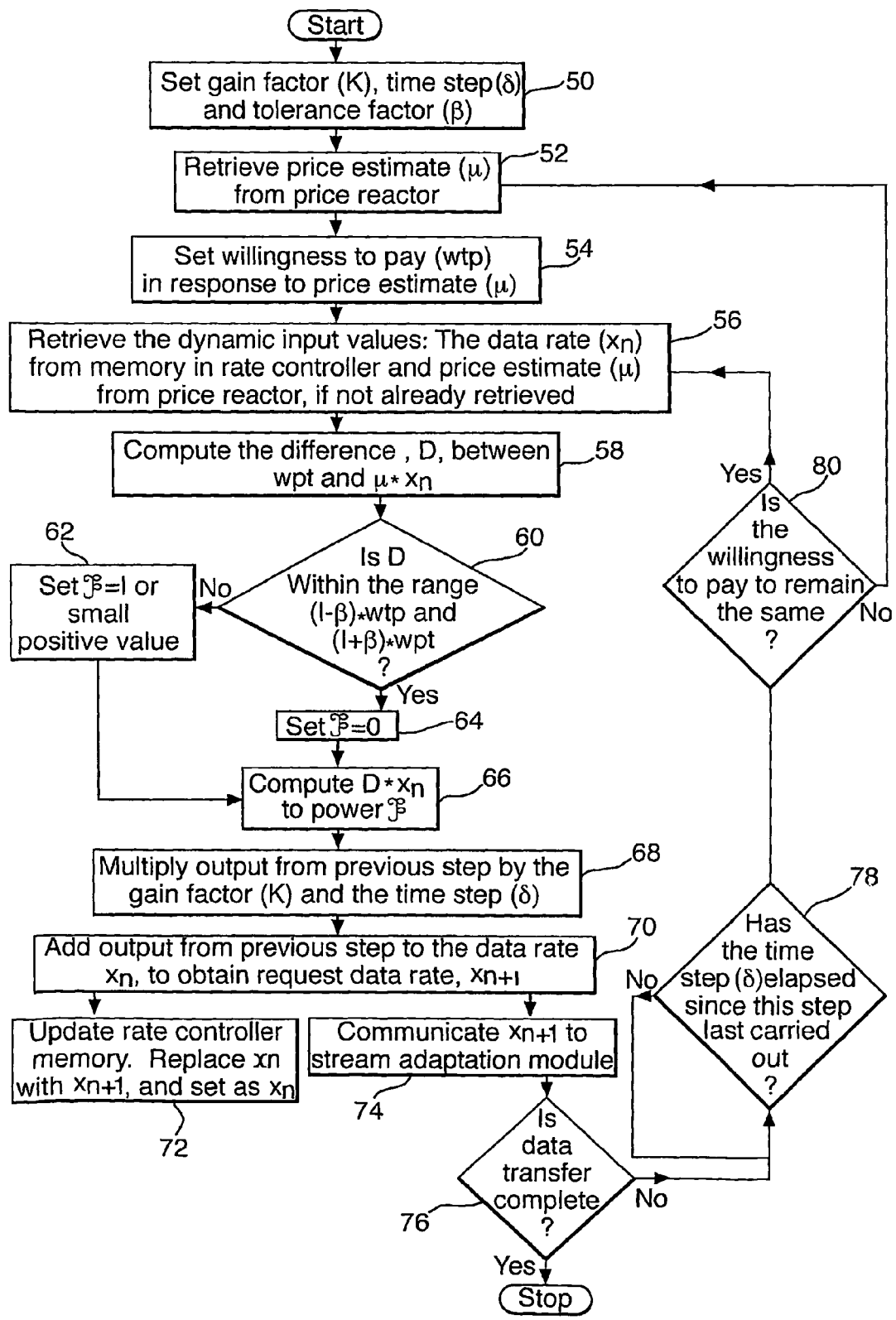
FIG. 5 is a flowchart illustrating schematically the operation of an embodiment of a further embodiment of the invention.

The $\xi$ algorithm has the distinct advantage over other equation based congestion algorithms depending on its implementation discussed below, of weighting the data rate to be requested by a variable parameter, $\xi$. This enable, for example, the $\xi$ algorithm to operate in different phases, i.e. depending on the network conditions at a particular time, its reaction to the particular conditions will be different, allowing it to adapt, and to ultimately cause data in the network to be handled more efficiently. The phase of the algorithm is determined by the value of $\xi$. The switching from one phase to another depends on network and user defined conditions. The present invention based on an assessment of these conditions causes the phase switch to occur automatically, to thus ensure a more efficient resource management. An embodiment showing the phase switch is shown in FIG. 5.

In the embodiment discussed below with reference to FIG. 4, $\xi$ is a weighting variable parameter.

In the embodiments discussed below with reference to FIG. 5, $\xi$ takes one of two values depending on the network conditions and the user's willingness to pay. $\xi$ is not however, limited in this respect and can take an infinite number of values. In this section the behaviour of the $\xi$ algorithm is observed with respect to a limited small subset of examples where $\xi$ has the value 0, −1 and +1. Also discussed in this section are the network and user defined conditions which apply to cause the algorithm to switch phases, ie. the conditions that apply to cause $\xi$ to change value. By responding to network conditions, the change in the selection of the value of $\xi$ will change the behaviour of the network, and in particular, as discussed above with reference to FIG. 1 and below with reference to FIG. 5, the requested data rate that is sent to a content provider.

In the first of the examples, $\xi$ is selected to be equal to zero. When $\xi = 0$, the algorithm behaves in the same way as the primal algorithm.

In the second example, $\xi$ is set to be equal to +1. It was mentioned earlier with reference to the prior art, that one of the problems of the primal algorithm is slow convergence due to the absence of a mechanism like slow-start in TCP. Setting $\xi = 1$ solves this problem: it provides a phase in which the transfer rate increases exponentially. This causes the algorithm to act "aggressively" to generate rapidly changing data rate requests which are sent to the content provider. This phase is particularly useful at the beginning of a data download, where the user will want to go from zero data rate request to a stable downloading data rate as quickly as possible. The proof in Theorem 4 with respect to the stability does not depend upon the value of $\xi$, so in theory the aggressive rate control strategy that is the result of setting $\xi$ to +1 does not compromise stability.

In the third example, $\xi$ is set to −1. Whereas $\xi = 1$ results in aggressive rate changes, setting $\xi = -1$ has exactly the opposite effect: the transfer rate will be adapted extremely slowly. This means that the convergence will be slow, but once equilibrium is reached, small perturbations will have little or no effect. In other words the local stability will be extremely good. This situation is very desirable for some applications, notably real-time video or audio streams. Thus, this phase is very useful in situations where no drastic adaptation of the transfer rate seems to be required, and the only changes are due to small perturbations in shadow price information around an equilibrium.

The present exemplary embodiment allows for the possibility of setting $\xi$ to 0 or +1 when relatively rapid changes of data rate request are required, for example to get sufficiently fast convergence, while setting $\xi = -1$ at other times to satisfy the needs of several different types of applications, for example, real time data download applications and multimedia applications.

The invention is not limited with respect to what determines the value of $\xi$. For example, however, one set of parameters to apply when changing $\xi = 1$ or 0 to $\xi = -1$ is in response to the marking rate which gives rise to congestion indication and the price charged by the network. When that price is within a tolerance parameter, beta, close to the price the user is willing to pay, $\xi$ can be set to −1 because when the price charged is more or less the same as the price the user is willing to pay, the data rate request should be kept as close to the user's willingness to pay as possible. This mechanism is explained in more detail with reference to FIGS. 4 and 5.

A preferred implementation of the invention is in software: the rate controller 16 acts as a single middleware that runs in the background on a user's machine. It captures a user specified buying policy from the policy selector 20 along with the real-time dynamic pricing information from the marking module 14 and produces a requested data rate using the $\xi$ algorithm described above.

The form in which the $\xi$ algorithm was present above, as a system of differential equations, makes it unsuitable to be implemented in software directly. Computers provide a discrete environment and cannot cope with the inherently continuous nature of a differential equation. To implement the invention in software, it is therefore necessary to include a discretisation step and to transform the differential equations into difference equations.

This results in equation (4), which may also be written as the following system:

$$x_r[t+1] = x_r[t] + \delta \kappa x_r[t]^\xi \left( w_r - x_r[t] \sum_{j \in r} m_j[t] \right) \quad (16)$$

where $$m_j[t] = p_j \left( \sum_{s:j \in s} x_s[t] \right),$$

and $\delta$ is the discretisation step size. Other techniques for solving differential equations numerically, for example numerical integration, could also be used.

The step size $\delta$ is important. It should not be too small, because of restrictions on computing power and the availability of price feedback, but a step size that is too large will result in errors. Preferably, the step size $\delta$ is chosen in accordance with the frequency of the price feedback availability. This will vary from network to network depending on the marking rate in the network. The period over which marks are collected and counted should not be too short, for then the number of marks will always be either 0 or 1, or perhaps a little higher, and most of the price information will then be conveyed by the number of marks in any one period. On the other hand, from the point of view of the rate control algorithm, it is desirable to have price feedback as frequently as possible.

Those skilled in the art will have no difficulty in providing a program to collect the parameters discussed above, applying the algorithm to those parameters to generate the network resource control described above, and shown step by step in FIGS. 4 and 5.

Figure 4:
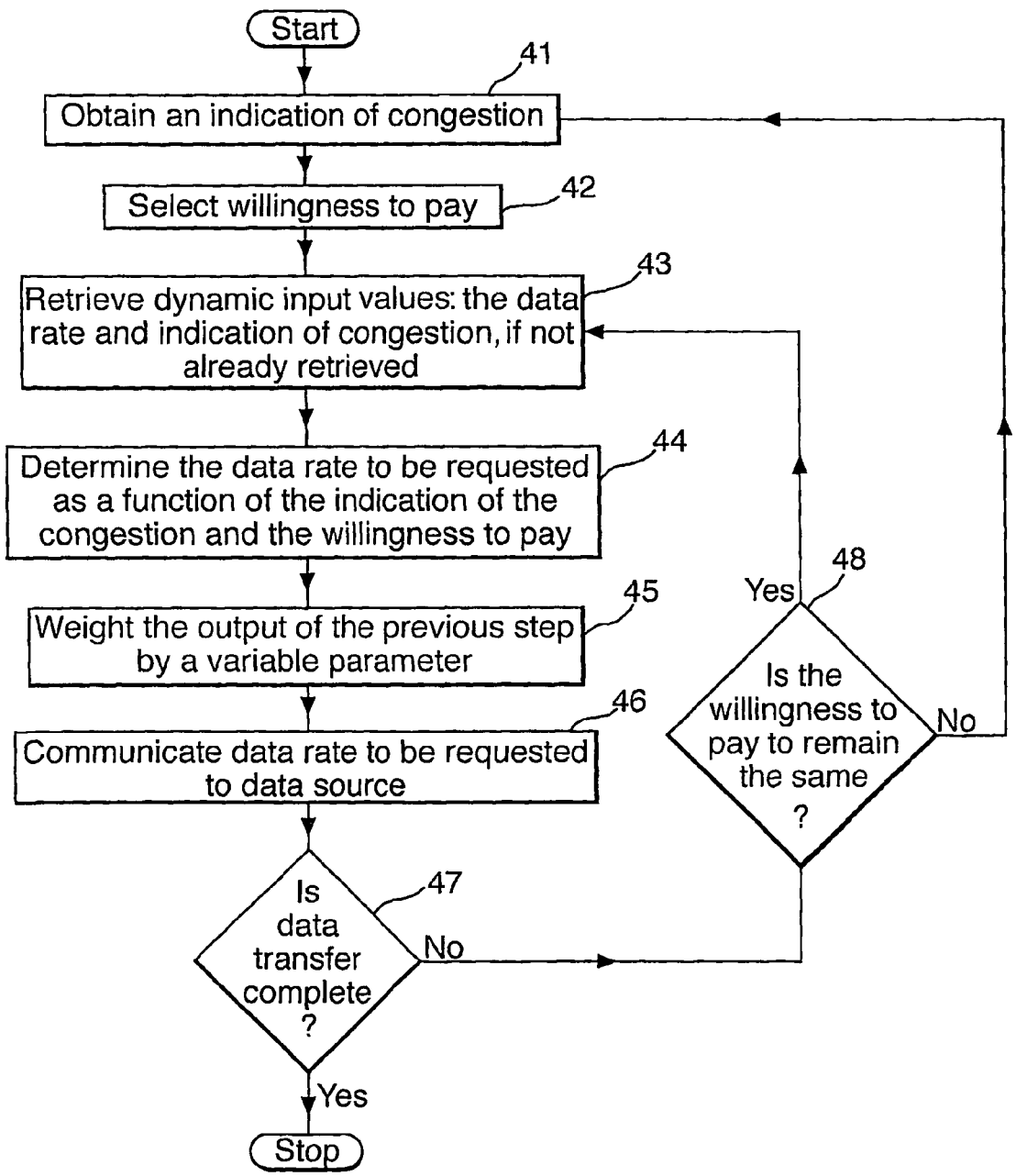
FIG. 4 is a flowchart illustrating schematically the operation of an embodiment of the invention.

The procedure for implementing resource control using the rate controller of the present invention is shown in FIGS. 4 and 5. The rate controller 16 functions according to the $\xi$ algorithm shown in equations (4) and alternatively notated in equation (16).

As mentioned above, the rate controller 16 preferably forms part of the DPH agent 8 shown in FIG. 1.

With reference to FIG. 4, at step 41, the indication of the congestion is obtained. In step 42, the willingness to pay is selected in response to the price reactor as described with reference to FIG. 1. In step 43 the dynamic input values are retrieved: the data rate, $x_n$ is retrieved from the memory 17 in the rate controller 16 and the indication of congestion is obtained from the price reactor 18 if not already retrieved. In step 58, the difference, D, between the willingness to pay and $m^*x_n$ is computed. In step 44, the data rate to be requested is determined as a function of the indication of the congestion and the willingness to pay. In step 45, the output of step 44 is weighted by a variable parameter, xi.

In step 46 the data rate to be requested is communicated to the content provider. In particular, this is done via the stream adaptation module 24.

In step 47, it is ascertained whether or not the data transfer is complete. If it is complete, the algorithm ends. If the transfer is not complete, it is ascertained in step 48 whether the willingness to pay, w, is to remain the same, or whether this user determined parameter is to change. If the willingness to pay is to remain unchanged, the algorithm proceeds directly to step 43 for the next iteration. If the willingness to pay is changed, the algorithm returns to step 41.

A further embodiment is now described with reference to FIG. 5. At step 50 the adaptation gain factor, kappa, and the discretisation constant, delta, are set. As mentioned, the selection of kappa will reflect a compromise reached between reactivity, also referred to as convergence and stability. The higher the value of kappa the ampler the reaction, and the greater the risk of instability. The lower the value of kappa, the more stable the data rate, and the greater the risk of not adapting enough. The choice of the value of delta will depend on the computing resource available, the marking rate and the frequency of the price feedback. At step 50, the constant beta is also set. This constant is a tolerance parameter reflecting the limits with respect to the network determined parameter, that is the price derived from the congestion indicators, within which the user determined parameter, that is the willingness to pay, should fall if the requested data rate is to remain stable. If the willingness to pay with respect to the price does fall within the tolerance parameter, xi is set to zero. If, on the other hand, the willingness to pay with respect to the price does not fall within the tolerance parameter, xi is set to 1 or to any other small positive value, to cause the algorithm to react speedily to request a higher data rate. The value of beta will depend on the network, and preferably lies between 1 and 10%. For example, if beta is set to 0.05, i.e. 5%, then the values obtained in step 60 is [0.95*w;1.05*w], or in other words, when that value differs from w by less than 5%, xi is set to 0 for a gentle adaptation, otherwise xi is set to 1 or a small positive value for the aggressive adaptation. In the particular example given above, the value of xi is a step function, however, how xi varies is not limited, and xi may also vary continuously, for example, with the difference between the price and the willingness to pay.

The values kappa, delta and beta do not have to remain fixed throughout the session or download. However, usually, they will remain fixed during one session.

In step 52, the price estimate, g, also referred as the congestion charge, is retrieved from the price reactor. It is noted that the price estimate $\mu$ may also be referred to as the congestion charge. In step 54 the willingness to pay, w, is set in response to the price reactor as described with reference to FIG. 1. In step 56 the dynamic input values are retrieved: the data rate, $x_n$ is retrieved from the memory 17 in the rate controller 16 and the price estimate, m, from the price reactor 18 if not already retrieved. In step 58, the difference, D, between the willingness to pay and $\mu^*x_n$ is computed. The product of $\mu^*x_n$, is the indication of congestion.

In step 60, it is established whether the difference, D, lies within the range 1-beta*w and 1+beta*w. If D does lie within the range then xi is set to 0 in step 64. If D does not lie within the range, xi is set to 1 or a small positive value in step 62. Once xi is set, the next step 66 is to compute the difference, D, multiplied by $x_n$ to the power xi, that is $D^* x_n^\xi$. In step 68, the output from step 66 is multiplied by the gain factor, kappa, and the time step, delta. In step 70, the output from step 68 is added to the data rate, $x_n$, to obtain the requested data rate, $x_n+1$. In step 74, the rate controller memory 17 is updated. $X_n$ is replaced with $x_{n+1}$, and set as $x_n$. In step 72 the data rate to be requested, $x_{n+1}$, is communicated to the content provider. In particular, this is done via the stream adaptation module 24. This may be communicated to the stream adaptation module via the quality of service controller 15.

In step 76, it is ascertained whether or not the data transfer is complete. If it is complete, the algorithm ends. If the transfer is not complete, it is ascertained in step 78, whether time step, delta, has elapsed since this step was last carried out. If the time period, delta, has not elapsed, the algorithm waits until it has. If the time period has elapsed, in step 80, it is ascertained whether the willingness to pay, w, is to remain the same, or whether this user determined parameter is to change. If the willingness to pay is to remain unchanged, the algorithm proceeds directly to step 56 for the next iteration. If the willingness to pay is changed, the algorithm returns to step 52.

Figure 6:
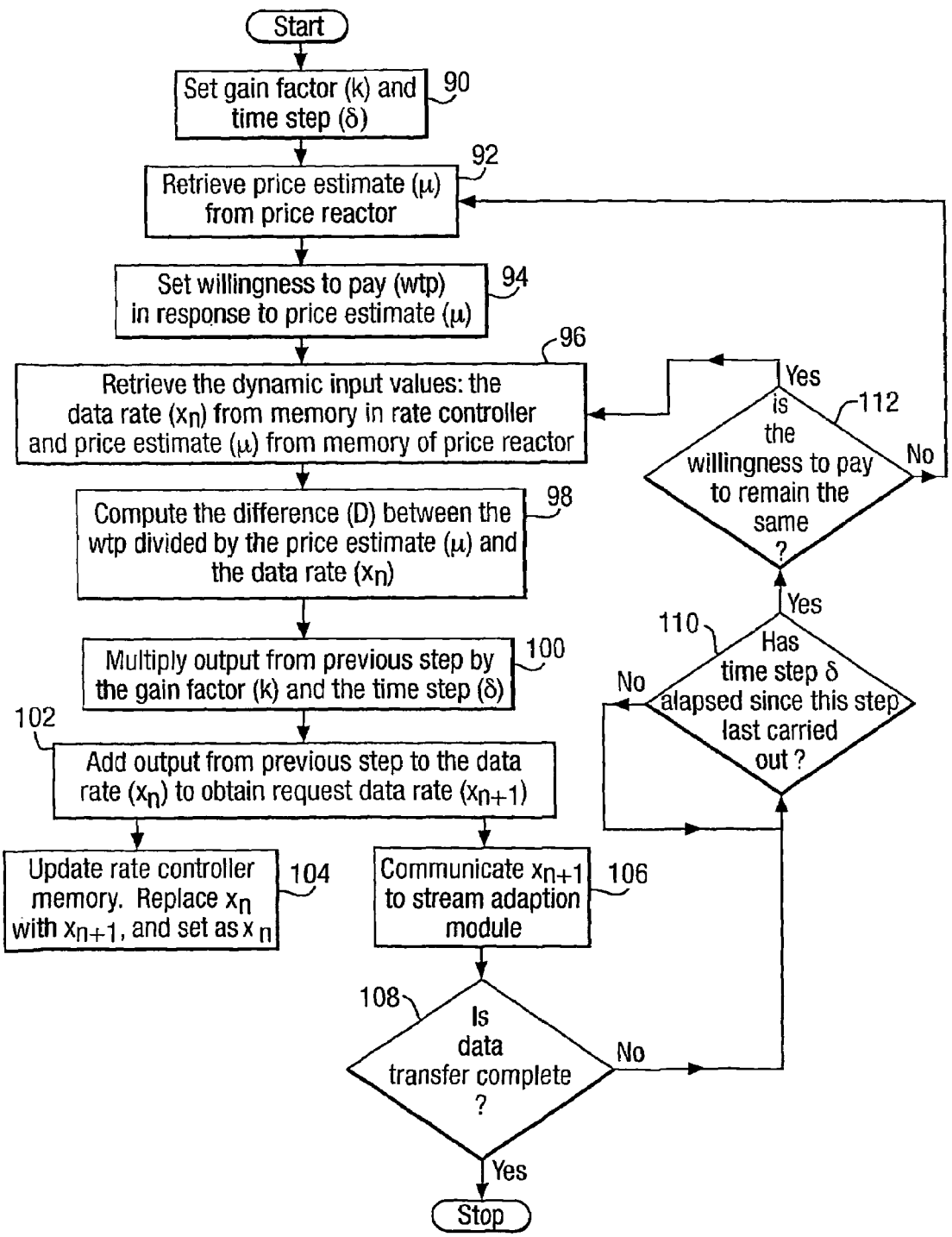
FIG. 6 is a flowchart illustrating schematically the operation of yet a further embodiment of the invention.

With reference to FIG. 6 the procedure for implementing resource control according to a different algorithm using the rate controller is shown. The rate controller 16 is comprised in the DPH agent 8 as for the previous algorithm and as shown in FIG. 1, but generates a request for data rate according to a different algorithm.

As with the xi algorithm, the algorithm is a discretisation of a system of differential equations. Hereinafter the algorithm, whose procedure is shown in FIG. 5 is referred to as the scalable algorithm.

The system of differential equations representing the scalar algorithm is:

$$\frac{d}{dt}x_r(t) = \kappa\left(\frac{wtp_r(t)}{\sum_{j \in r} \mu_j(t)} - x_r(t)\right), \quad (17)$$

for r∈R.

This system of differential equations was developed from the willingness to pay (w). As mentioned previously, the willingness to pay represents the amount a user is willing to pay for the service provided by the network. In general this amount can vary over time, so willingness to pay becomes a function of time. The scalar algorithm, rather than taking a single data stream, describes the overall behaviour of the network.

Again, as with the xi algorithm, the form in which the scalar algorithm was presented above in equation (17), as a system of differential equations, makes it unsuitable to be implemented in software directly. Computers provide a discrete environment and cannot cope with the inherently continuous nature of a differential equation. To implement the invention in software, it is therefore necessary to include a discretisation step and to transform the differential equations into difference equations. This results in equation (18), which may also be written as the following system:

$$x_{n+1} = x_n + \delta * \kappa * \left(\frac{w}{\mu} - x_n\right) \quad (18)$$

where the parameters are the same as those referred to above with respect to the xi algorithm.

The advantage of a rate controller implemented according to the scalar algorithm is that the convergence properties depend only on the relative variation of the congestion charge ($\mu$), that is, it will take as long to settle to the new equilibrium when the congestion level goes from 9% to 12% as when the congestion goes from 3% to 4%.

The implementation of this algorithm is now described with reference to FIG. 5. At step 90, the gain factor, kappa, and the time step, delta, are set. At step 92, the price estimate ($\mu$) is retrieved from the price reactor 18. At step 94, the willingness to pay (w) is set in response to the price estimate (m). At step 96 the dynamic input values are retrieved. The data rate ($x_n$) is retrieved from the memory 17 in the rate controller 16 and the price estimate ($\mu$) is retrieved from the memory of the price reactor 18. At step 98, the difference (D) between the willingness to pay (w) divided by the price estimate ($\mu$) and the data rate ($x_n$) is computed. At step 100, the output from the previous step 98 is multiplied by the gain factor (kappa) and the time step (delta). A step 102, the output from previous step 100 is added to the data rate ($x_n$) to obtain the request data rate ($x_{n+1}$). At step 104 the memory 17 in the rate controller 16 is updated. $X_n$ is replaced with $x_{n+1}$. At step 106, the value of $x_{n+1}$ is communicated to the stream adaptation module 24. At step 108, it is ascertained whether the data transfer is complete. If it is complete, the program stops. If it is not complete, at step 110, it is ascertained whether time step, delta, has elapses since this step was last carried out. If the time period, delta, has not elapsed, the algorithm waits until it has. If the time period has elapsed, in step 112, it is ascertained whether the willingness to pay, w, is to remain the same, or whether this user determined parameter is to change. If the willingness to pay is to remain unchanged, the algorithm proceeds directly to step 96 for the next iteration. If the willingness to pay is changed, the algorithm returns to step 92.

Unless the context clearly requires otherwise, throughout the description and the claims, the words "comprise", "comprising" and the like are to be construed in an inclusive as opposed to exclusive or exhaustive sense; that is to say, in the sense of "including, but not limited to".

What is claimed is:

1. A method of controlling the rate of data transmission from a source of data to a user via a communications link, wherein processing means are provided to generate a signal representing a rate request which will be used in determining the rate at which data will be transmitted from the source to the user, said processing means generating the signal by:

obtaining a congestion charge on said communications link, selecting a value indicative of the user's willingness to pay for a given transmission data rate, determining the rate to be requested using the following iterative equation:

$$x_{n+1} = x_n + \text{delta} * \text{kappa} * x_n^\xi (w - x_n * \mu)$$

where $x_n$ is the data transmission rate (bits per second) as calculated at an nth iteration; and $x_{n+1}$ is the rate to be determined; $x_n * \mu$ is the charge to the user indicative of amount of congestion and is the product of $x_n$ and congestion charge $\mu$; w is the willingness to pay; delta is the time elapsed between two iterations; kappa is a constant gain parameter; and $\xi$ (xi) is a reactivity parameter which varies during the data transmission to control the speed with which said rate requests are adapted in response to changing congestion conditions as a function of the indication of a difference between the user's willingness to pay and a congestion cost which is the product of congestion charge and a previously determined data transmission rate, said difference being weighted by a variable parameter, the processing means thereafter communicating the signal to the source of data and the rate of the data transmission from the data source to the user then being controlled on the basis of the signal.

2. A method according to claim 1, wherein said reactivity parameter assumes discrete values.

3. A method according to claim 1, wherein the value of said reactivity parameter varies continuously.

4. A method according to claim 1, wherein the value of said reactivity parameter varies in accordance with the difference between the user's willingness to pay and the indication of the amount of congestion.

5. A method according to claim 1, wherein:
the value of said reactivity parameter is set depending on the indication of congestion or the user's willingness to pay.

6. A method according to claim 4, wherein if the difference between the indication of the amount of congestion and the user's willingness to pay falls within a predetermined range a first data rate is requested, and if the difference between the indication of the amount of congestion and the user's willingness to pay falls outside the predetermined range a second different data rate is requested.

7. A method according to claim 4 wherein said parameter $\xi$ is a step function assuming the value 0 for values of said difference larger than a threshold value, and assuming the value 1 for values of said difference smaller than said threshold value.

8. A method according to claim 1 wherein obtaining a congestion charge includes determining a marking rate m of incoming data transmitted on said communications link and wherein said congestion charge is determined from said marking rate.

9. A rate controller for controlling the rate of data transmission from a source to a user via a communications link, said rate controller including processing means for generating a signal representing a rate request which will be used in determining the rate at which data will be transmitted from the source to the user, said processing means including:
means for obtaining a congestion charge for said communications link,
selecting means for selecting a value indicative of the user's willingness to pay for a given transmission data rate,
determining means adapted to determine said rate to be requested using the following iterative equation:

$$x_{n+1} = x_n + \text{delta} * \text{kappa} * x_n^{\xi}(w - x_n * \mu)$$

where $x_{n+1}$ is the data transmission rate (bits per second) as calculated at an nth iteration and $x_{n+1}$ is the rate to the determined; $x_n * \mu$ is the charge to the user indicative of amount of congestion and is the product of $x_n$ and congestion charge $\mu$; w is the willingness to pay selected by selected means in response to a determined transmission rate; delta is the time elapsed between two iterations; kappa is a constant gain parameter; and $\xi$ (xi) is a reactivity parameter which varies during the data transmission to control the speed with which said rate requests are adapted in response to changing congestion, and
means for communicating the signal to the source, wherein the rate of the data transmission from the source to the user is controlled on the basis of the signal.

10. A rate controller according to claim 9, wherein said determining means is adapted to, determine the difference between the user's willingness to pay and the indication of the amount of congestion, and vary the value of the reactivity parameter in accordance with the difference.

11. A rate controller according to claim 9, wherein said determining means determines a first rate to be requested if said difference between the indication of the amount of congestion and said selected value falls within a predetermined range, and a second different data rate to be requested if the difference between the indication of the amount of congestion and the value falls outside the predetermined range.

12. A rate controller according to claim 9, wherein the value of said reactivity parameter is set depending on the indication of congestion or the user's willingness to pay.

13. A rate controller according to claim 9, wherein said means for obtaining a congestion charge comprises metering means for determining a marking rate of incoming data transmitted on said communications link.

14. A rate controller according to claim 10, wherein said reactivity parameter is a step function assuming the value 0 for values of said difference larger than a threshold value, and assuming the value 1 for values of said difference smaller than said threshold value.

15. A computer readable medium encoded with computer executable instructions executable by the processor to perform the steps of claim 1.

* * * * *